US006304315B2

(12) United States Patent
Kessler et al.

(10) Patent No.: US 6,304,315 B2
(45) Date of Patent: *Oct. 16, 2001

(54) HIGH SPEED HIGH RESOLUTION CONTINUOUS OPTICAL FILM PRINTER FOR DUPLICATING MOTION FILMS

(75) Inventors: David Kessler; David H. Kirkpatrick, both of Rochester, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/386,820

(22) Filed: Aug. 31, 1999

(51) Int. Cl.[7] .......................... G03B 27/48; G03B 27/70; G03B 27/54; G02B 17/00

(52) U.S. Cl. ............................ 355/51; 355/66; 355/67; 359/366

(58) Field of Search ..................... 355/18, 43, 50, 355/51, 66, 67, 77, 46; 250/228; 359/366

(56) References Cited

U.S. PATENT DOCUMENTS

| | | | | |
|---|---|---|---|---|
| 1,752,753 | * | 4/1930 | Owens | 355/31 |
| 1,789,112 | * | 1/1931 | Owens | 355/46 |
| 1,801,450 | * | 4/1931 | Owens | 355/43 |
| 1,836,038 | * | 12/1931 | Owens | 355/46 |
| 1,950,092 | * | 3/1934 | Owens | 355/31 |
| 2,023,348 | * | 12/1935 | Mihaly | 355/51 |
| 2,058,415 | * | 10/1936 | Chretien | 355/46 |
| 2,298,422 | * | 10/1942 | Sandvik et al. | 355/31 |
| 3,040,619 | | 6/1962 | Oxberry | 355/46 |
| 3,748,015 | | 7/1973 | Offner | 350/55 |
| 4,167,677 | | 9/1979 | Suzki | 356/401 |
| 4,467,361 | | 8/1984 | Ohno et al. | 348/340 |
| 4,796,984 | * | 1/1989 | Wynne | 350/444 |
| 4,868,383 | | 9/1989 | Kurtz et al. | 250/228 |
| 5,221,975 | | 6/1993 | Kessler | 358/474 |
| 5,548,328 | * | 8/1996 | Wakefield | 348/98 |
| 6,018,383 | * | 1/2000 | Dunn et al. | 355/49 |

OTHER PUBLICATIONS

Akiyoshi Suzuki, "Complete Analysis of a Two–Mirror Unit Magnification System. Part 1", Dec. 15, 1983/vol. 22, No. 24/Applied Optics, pp. 3943–3949.

Akiyoshi Suzuki, "Complete Analysis of a Two–Mirror Unit Magnification System. Part 2", Dec. 15, 1983/vol. 22, No. 24/Applied Optics, pp. 3950–3956.

* cited by examiner

Primary Examiner—Russell Adams
Assistant Examiner—Rodney Fuller
(74) Attorney, Agent, or Firm—Nelson Adrian Blish

(57) ABSTRACT

A high speed, high resolution, continuous optical film printer (25) is disclosed for copying negative intermediate film (11) onto a print film (12). The two films are placed side by side on a common transport shaft (13) and moved past an illumination system comprised of a source (30) and an integrating cylinder (15a). A unit magnification imaging optical system (25) produces a telecentric, monocentric, color corrected, high resolution, low flare image strip (18) on the print film which is parallel to the object strip. The optical film print also provides angularly diffuse illumination to provide scratch and matte suppression.

5 Claims, 5 Drawing Sheets

HIGH SPEED HIGH RESOLUTION CONTINUOUS OPTICAL FILM PRINTER FOR DUPLICATING MOTION FILMS

FIELD OF THE INVENTION

The invention relates to high-speed, high-resolution optical film printers for duplicating motion picture films.

BACKGROUND OF THE INVENTION

It is common in the motion pictures industry to optically duplicate the camera negative after it has been processed onto a positive intermediate film. The positive intermediate film is processed and then copied onto one or more negative intermediate films. The negative intermediate film is then processed and contact printed onto print film which is processed and sent to theaters to be projected. This final process of contact printing has to be done at very high speed since many copies are needed for distribution to many theaters within a short period of time.

A contact printer, shown schematically in FIG. 1, can print up to 2,000 feet per minute. The print film 12, the copy film, is placed on sprocket wheel 37 and the negative intermediate film 11, the master film, is placed on top of the print film on the same sprocket wheel 37. Light source 39 exposes the print film 12 through the negative intermediate film 11. Because of the thickness of the film stock, the two films, which are wrapped one on top of the other around the same sprocket, are driven at slightly different operating radii. This difference in transport speed is addressed by using a shorter perforation pitch for the print film. But even with this solution there is the possibility a build-up of tension between the films which may cause a sudden film displacement, and create a visible image shift on screen when the print film is projected.

There are additional problems associated with the contact printer described above. If the films are not held in intimate contact, image loss may occur due to defocusing of the image. If, however, the two films are held at high pressure Newton rings can occur, or in extreme cases one film may physically damage the other, resulting in loss of registration and decrease in image quality of the print film. Yet another severe problem with contact dry printers is the possibility of dirt transfer from the print film onto the intermediate negative film which diminishes the quality of subsequent prints from the same intermediate film.

Optical printing is another way to duplicate film. In this process the negative intermediate film and the print film are not in contact but instead a lens is used to image one film onto the other. The films are moved on mechanical shuttles, one frame at a time, and are stationary during exposure and image registration, thus the position of the frame in respect to the perforations is good. However, due to the start and stop motion of the film transport system, this duplication method is slow and typically operates at less than 200 feet per minute.

A Cosharp printer, described by John Mosely in the SMPTE Journal, Sep. 1992, was an attempt to combine the speed of the continuous web transport of the contact printer and the attributes of optical printing. This printer used a common transport shaft on which the negative intermediate 65 mm films, and the 35 mm print film were placed. In this device the copy registration is not affected by speed variations of the transport. An optical system provides demagnification from the 65 mm format to the 35 mm format. Since the two formats used different perforation systems, i.e. 5 perforation per frame in one and 4 perforations per frame in the other, the mechanical design accommodates this difference by using different diameter sprockets on a common transport shaft. While the Cosharp system did provide for the placement of both the intermediate negative and the print film on the same transport shaft, it used a very complex optical system incorporating 28 spherical elements, 4 cylinder elements and two large flat mirrors.

An important image quality issue in film duplication is matte and scratches. Matte is the term used to describe a layer of transparent beads with diameters of a couple of microns which are spread on one or both sides of a film to control friction and prevent film sticking when spooled. Matte surfaces are basically phase objects, which can be rendered less visible as the angular spread of the illumination is increased. When the film is illuminated with specular light, i.e. light with limited angular spread, the phase objects become visible in a manner similar to the way a phase contrast microscope transforms phase variations in a transparent object into an amplitude variations. Scratches in the emulsion or base are also phase objects. When the negative intermediate film is coated with matte or is scratched, and is specularly illuminated, the image may be degraded and the scratches and matte may become visible on the copy.

The suppression of matte and scratches is common in the photofinishing industry where 35 mm film images are commonly printed onto photographic paper using diffuse illumination. Kessler, U.S. Pat. No. 5,221,975 discusses scratch and matte suppression by diffuse illumination in the context of a film CCD scanner. However, in the motion pictures industry, most of the optical printing today is done with relatively specular illumination, i.e. with the angular extent of the light at the film plane being under±6°. For good scratch and matte suppression much larger angles are needed, on the order of±30° or above. Thus current optical film duplicators do not suppress matte and scratches well. When there is a need for scratch or matte suppression, the current solution is to use a contact printer or an optical printer equipped with a wet gate. Such printers are slow, however, on the order of up to 200 feet per minute, due to restrictions on the film speed in the liquid, and the need to dry the solution from the film prior to spooling.

Another problem with the optical printers used in the film industry today is that they use lenses, such as the Printing Nikkor lens, which contain multiple refractive elements. These lenses, though of relatively good quality, are limited in terms of the veiling glare, due to a large number of glass components. Low flare, low veiling glare, and high resolution optics for 1:1 imaging is disclosed by Offner in U.S. Pat. No. 4,467,361, wherein two mirrors provide for unit magnification imaging optics for the microlithographic industry. Kessler in U.S. Pat. No. 5,221,975 discloses the use of the Offner system for film scanners. The attributes of this optical system in terms of cost and ease of alignment were also discussed by Kessler. However, the reflective, monocentric imagers disclosed by Offner and Kessler are not adapted for use in film printers in the motion pictures industry.

SUMMARY OF THE INVENTION

It is an object of the present invention to overcome the problems in the prior art discussed above and to provide an improved high speed, high resolution continuous optical film printer for duplicating motion picture films with matte and scratch suppression.

In accordance with one aspect of the present invention, a high speed, high resolution continuous optical film printer is comprised of a common transport shaft which provides fast continuous transport of both a negative intermediate film and a print film. The negative intermediate film and the print film are placed side by side on a common transport shaft. An illumination system with a high numerical aperture provides scratch and matte suppression and is applied on an annular area of the negative intermediate film. A unit magnification imaging system comprised of two essentially concentric folding mirrors projects an image strip side by side with the object strip on the print film.

A principal advantage of the invention is that the optical film printer is as fast as a dry contact printer and yet does not have dirt transfer problem. The optical film printer has the performance of optical printers in terms of resolution, and has the scratch and matte suppression comparable to that of a wet gate contact printer.

The invention and its objects and advantages will become more apparent in the detailed description of the preferred embodiment presented below.

DETAILED DESCRIPTION OF THE INVENTION

Figure 1:
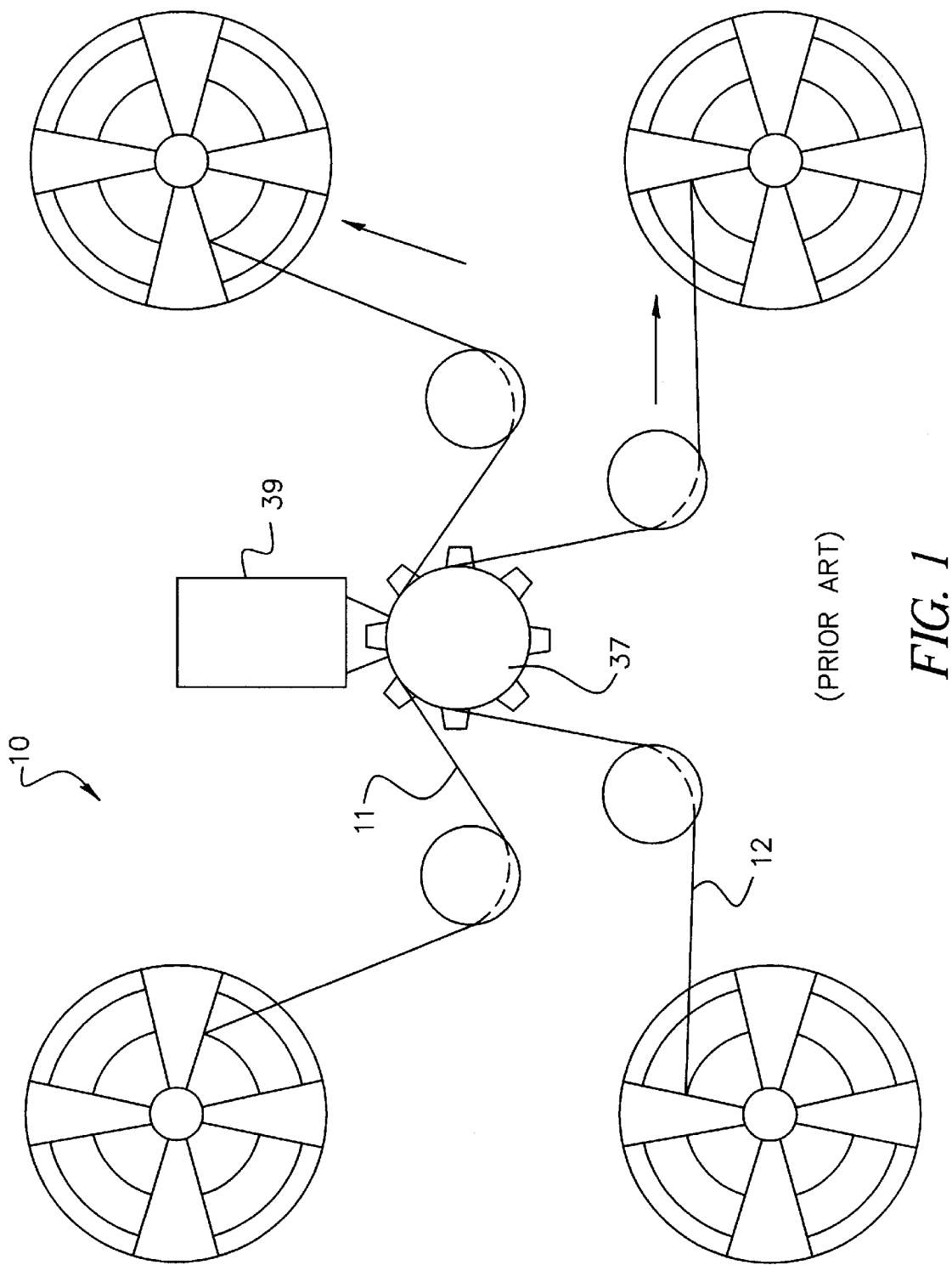
FIG. 1 is a schematic view of a prior art contact optical printer.
Figure 2:
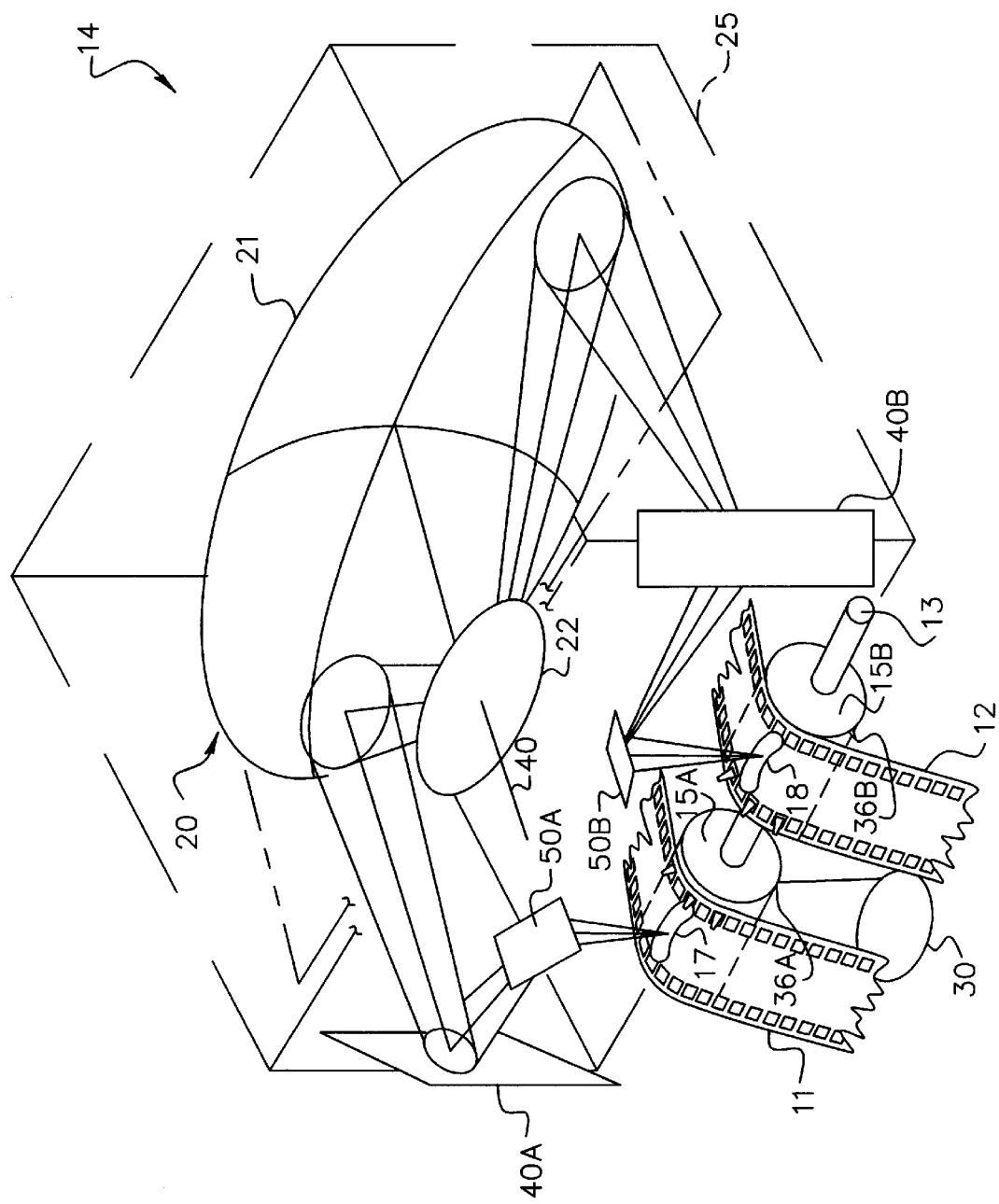
FIG. 2 is a perspective view of the preferred embodiment of an optical film printer according to the present invention.
Figure 5:
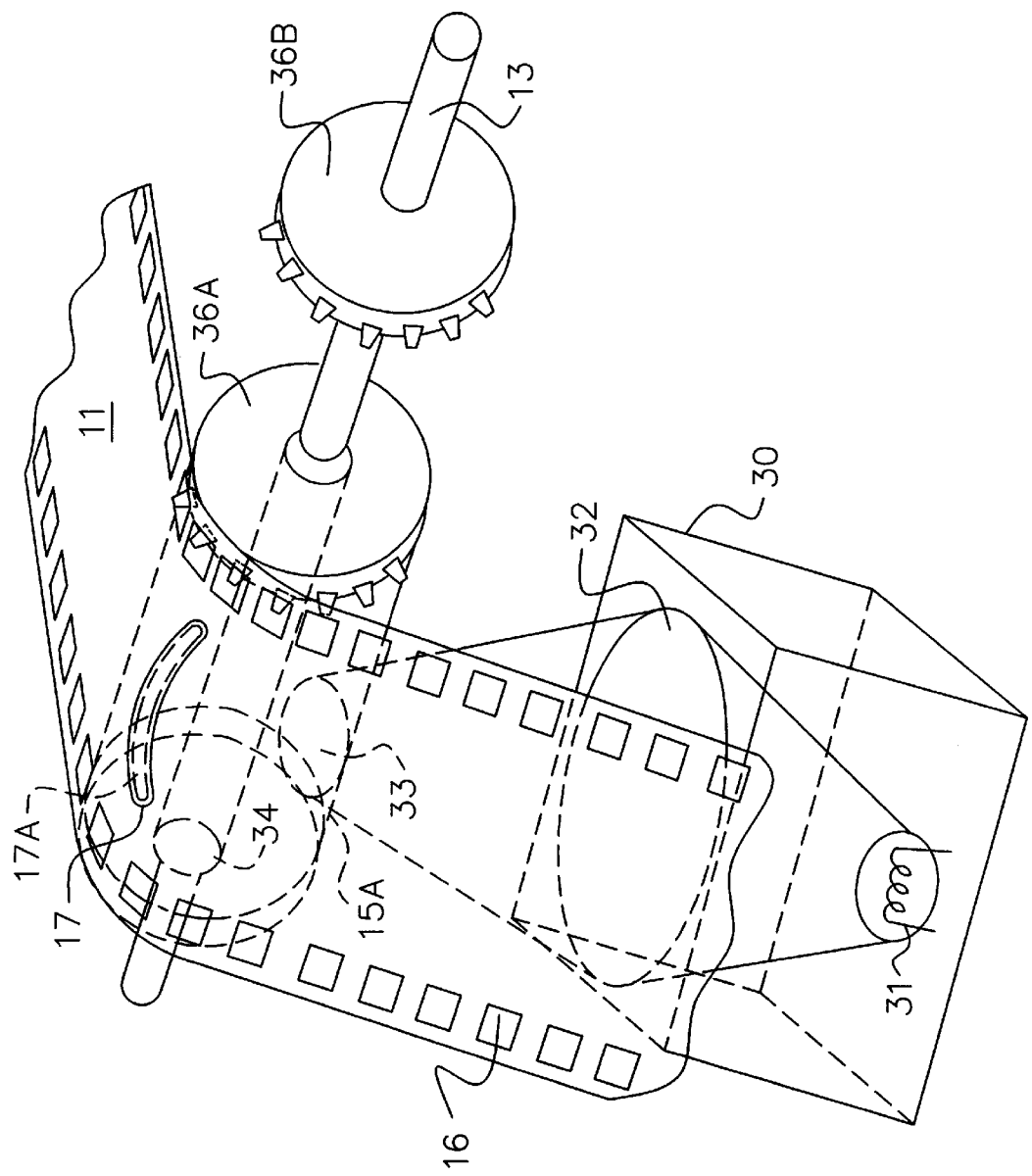
FIG. 5 is a perspective view, partially in phantom, of a highly diffuse illumination system according to the present invention built around a common transport shaft.

A high speed, high resolution, continuous optical film printer 14 for duplicating motion picture films according to the present invention is shown in FIG. 2. Light from source 30 enters integrating cylinder 15a through an opening 33, shown in more detail in FIG. 5. Highly divergent light emanates from annular opening 17a and illuminates an object strip 17 on negative intermediate film 11.

Figure 3A:
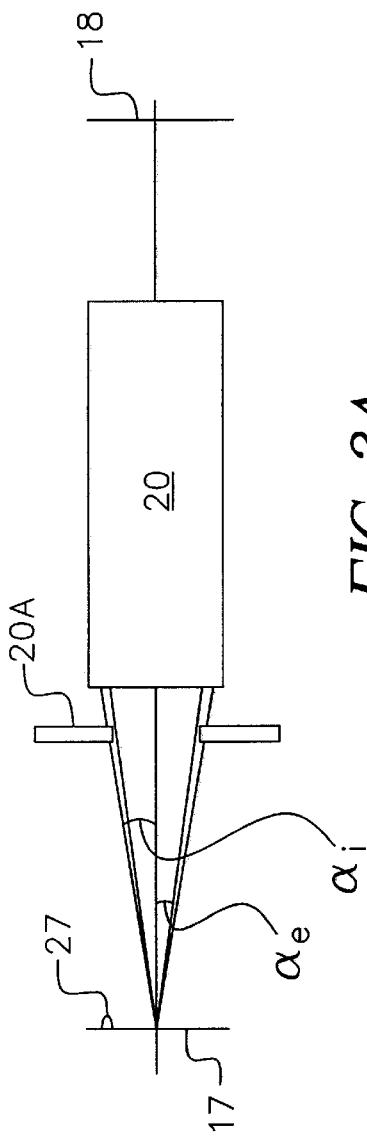
FIG. 3a is a schematic view of Numerical Aperture for the illumination optics and the imaging optics as used in the prior art.
Figure 3B:
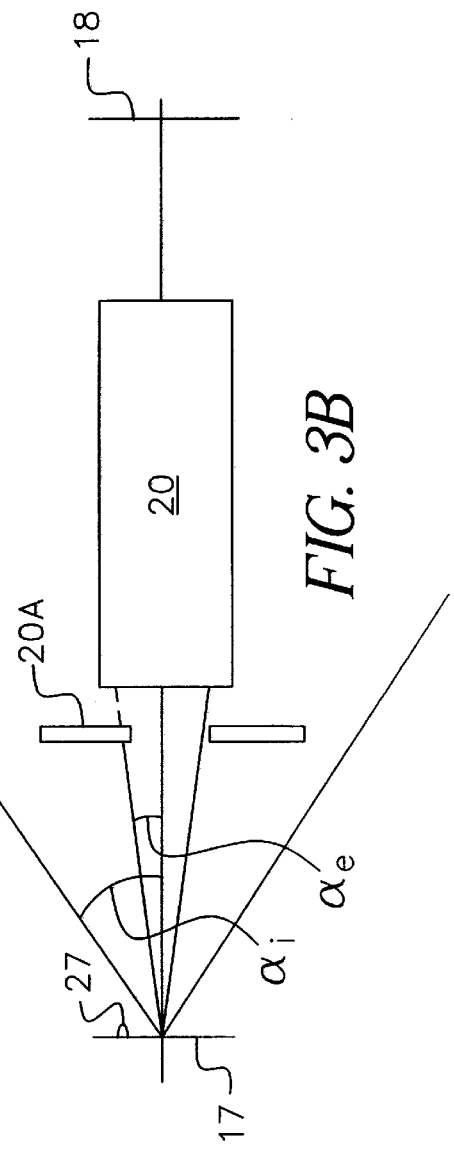
FIG. 3b is a schematic view of Numerical Aperture for the illumination optics and the imaging optics according to the present invention.

Referring to FIGS. 3a–3b, the term Numerical Aperture of the Illumination ($NA_i$) measures the divergence of the light illuminating the film. $NA_i = \sin(\alpha_i)$ where $\alpha_i$ is the semi-angular spread of light on negative intermediate film 11. The term Effective Numerical Aperture ($NA_e$) measures the effective Numerical Aperture of the imaging lens. $NA_e = \sin(\alpha_e)$ where $\alpha_e$ is the semi-angular collection angle of the imaging lens. Prior art optical printers use specular illumination where $NA_i \sim NA_e$, shown on FIG. 3a. While this arrangement is efficient in terms of light transmission, the system is susceptible to image degradation due to any phase variations in the optical plane such as scratches. This is because lens-like phase features 27 at a certain spot on object strip 17, when specularly illuminated, will deflect light which may miss the entrance pupil 20a of the imaging optics 20 shown schematically as a box. The image of this lens-like phase feature 27 object at the image strip 18 will show as a dark spot. This is basically the mode of operation of the phase contrast microscope, which is built with specular illumination so as to enhance the visibility of phase objects.

In the preferred embodiment, shown in FIG. 3b, $NA_i >> NA_e$ to provide for scratch and matte suppression. In other words, the entrance pupil 20a of the imaging optics 20 is overfilled which produces a true incoherent imaging of the object. The visibility of scratches and matte is reduced when the illumination is made more incoherent. Thus the image of object feature 27 will be hardly noticeable. A typical lens used in prior art optical film printing is a unit magnification Nikkor Printing Lens which has a focal distance of 105 mm and which operates at an effective F/number of 5.6 which is equivalent to $NA_e = 0.09$. Typical $NA_e$ are between 0.05 to 0.125. In the present invention similar $NA_e$ values are used, but the illumination numerical aperture $NA_i$ are larger than 0.4.

Referring again to FIG. 5, source 30 contains a lamp 31 and a condenser lens 32. The lamp is a tungsten halogen lamp in the preferred embodiment, however, a xenon lamp such as a Cermax lamp or a metal halide lamp such as the Phillips UHP lamp can be used. The light from source 30 is condensed by lens 32 onto an opening 33 in integrating cylinder 15a, similar to the integrating tube disclosed in U.S. Pat. No. 4,868,383 by Kurtz et al. The integrating cavity is essentially a cylindrical version of an integrating sphere. The internal surfaces are Lambertian and white. The integrating cylinder 15a according to this invention is unique in that it has an internal cylinder 34 in which common transport shaft 13 rotates, driving sprocket wheel 36a and 36b. Thus, integrating cylinder 15a is stationary while the transport shaft 13 rotates.

Light entering through opening 33 is trapped in the annular space between integrating cylinder 15a and cylinder 34. The light is diffused by the cavity and emerges as highly divergent light through opening 17a, which is preferably annular to match the imaging properties of the imaging system as will be explained in more detail below. The intermediate negative film 11 is placed close to annular opening 17a and illuminated by the highly divergent light.

Negative intermediate film 11, is illuminated over an annular object strip 17 as shown. Negative intermediate film 11 is placed on the sprocket wheel 36a and the print film 12 is placed on sprocket wheel 36b. Both sprocket wheels 36a and 36b engage perforations in each of the film. Both sprocket wheels 36a and 36b are mounted on and driven by the same common transport shaft 13 to ensure precision transfer of the image from one film to the other, independent of speed variations of the transport. In the preferred embodiment, the perforations on sprocket wheels 36a and 36b are machined as one unit in the same machining operation to ensure precise alignment.

Referring back to FIG. 2, the illuminated annular object strip 17 is imaged onto print film 12 to create an annular image 18. A unit magnification optical imaging system 25 i.e. imaging with magnification of 1 to 1, is comprised of a concave spherical mirror 21 and a convex spherical mirror 22 and two sets of flat folding mirrors 40a and 50a, and mirrors and 40b and 50b. The function of the folding mirrors is to place the annular object strip 17 and its annular image strip 18 side by as shown in FIG. 2. In one embodiment, two facets of prism are coated, and the coated facets comprise mirrors 50a and 50b. The imaging optics 20, comprising concave spherical mirror 21 and convex spherical mirror 22, are described in Offner, U.S. Pat. No. 3,748,015, which was originally designed for the Perkin Elmer Micralign system to copy a 6" diameter mask onto a 6" diameter silicon wafer.

Figure 4A:
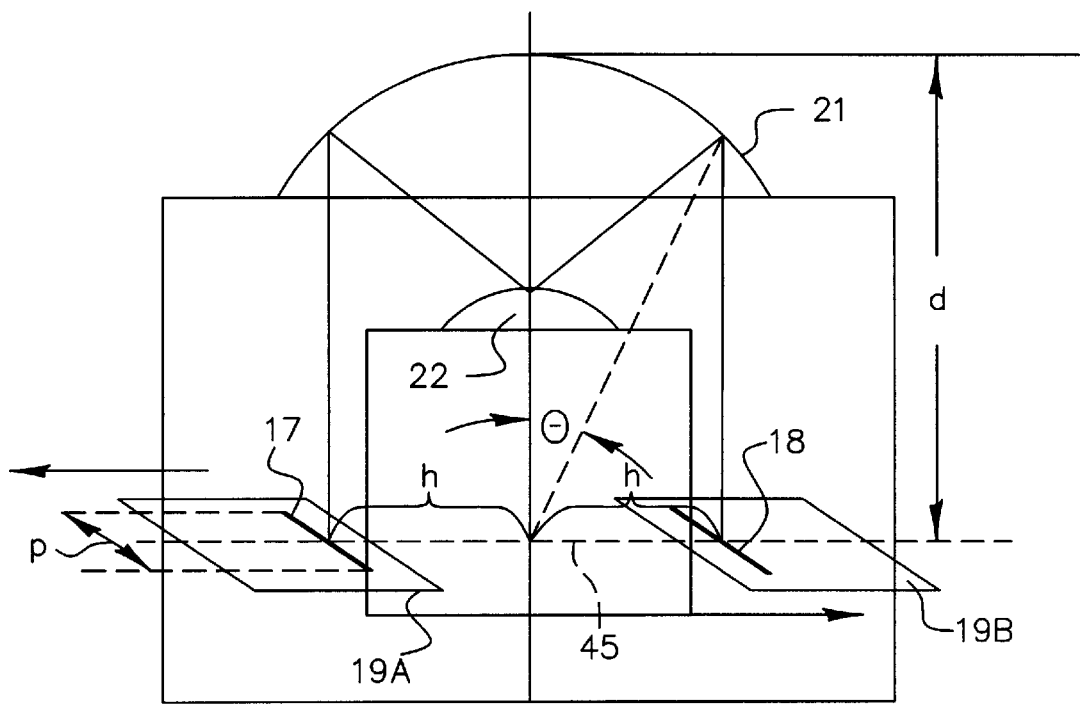
FIGS. 4a and 4b are schematic views of a unit magnification monocentric imagers.

FIG. 4a shows the principal of operation of the Offner system as scaled for use according to the present invention, but with the folding mirrors 40*a* and 50*a*, and 40*b* and 50*b* removed for clarification. The object size is approximately 35 mm. The imaging is accomplished only over an annular object strip 17 as shown. To cover the whole two dimensional film frame 19*a* the negative intermediate film 11 and the print film 12 have both to be translated in opposite directions (note that the folding mirrors have been removed for clarification) with extremely high precision. The optical system is essentially concentric about point 45. The convex mirror 22 has half the radius of curvature of the concave mirror 21.

The performance of unit magnification optical imaging system 25 is exceptional. It has no third order aberrations, it is doubly telecentric (and thus afocal), and it is color corrected since it uses only mirrors. The system is monocentric about the optical axis 41. Thus the area of best image quality at the object plane is annular, and centered at the optical axis 40. In the meridional plane, the field is limited by high order astigmatism and high order spherical aberration. (See A. Suzuki, "Complete Analysis of a two mirror unit magnification system Part I and II", Applied Optics, Vol 22, No 24, 3943, 1983.)

Figure 4B:
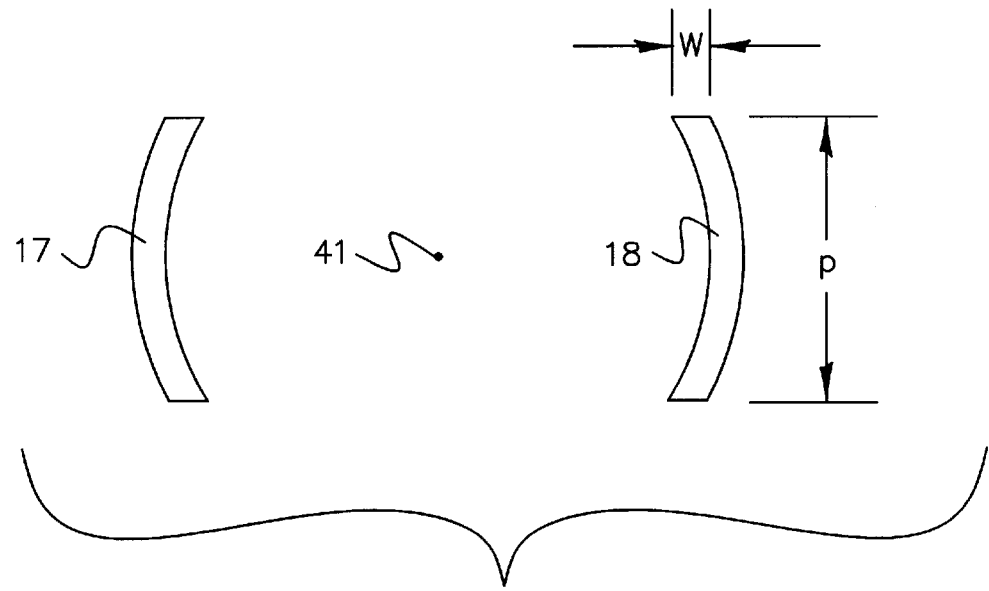

Using another feature of this invention, two sets of folding mirrors 40*a* and 50*b*, and 40*b* and 50*b*, as shown in FIG. 2, are used to transform the object and image placement from the orientation shown in FIG. 4*b* to the one shown on FIG. 2 where both the annular object strip 17 and the annular image strip 18 are placed side by side and the transport of the films is done with a common transport shaft 13.

The common transport shaft has three advantages. First, small variations in the transport speed do not degrade the image quality, but instead cause imperceptible variations in exposure. Secondly, displacement of the shaft in a direction perpendicular to film transport direction, i.e. film weave motion, does not cause image displacement on the print film since the print film and the projected image of the intermediate negative film move by the same amount and in the same direction. Thirdly, by placing the films side by side and moving in the same direction; it is easier to make the mechanical modifications to a contact printer according to the prior art which are required to convert it to a continuous optical printer according to this invention.

It is also possible to maintain the two films on the common transport shaft 13 as shown in FIG. 2 but to place the exposure and imaging systems at some distance away.

An example for a design of the imaging optics according to the preferred embodiment is given below for the unfolded 1:1 imaging system as shown on FIG. 4*a*. The radius of curvature of the concave mirror–300 mm. Radius of curvature of the convex mirror+150 mm. The distance d on FIG. 4*a* between the mirrors along the optical axis is 146.907 mm. With this separation, the centers of curvature of the two mirrors are not exactly coincident as in the original Offner system. The slight separation of about 0.4 mm between the centers of curvature has been shown by Suzuki to provide essentially doubling of the usable field, i.e. double the width of the annular object strip 17 and its annular image strip 18 on FIG. 4*a*. The distance h from the axis 41 to the object strip 17 and from the axis to the image strip 18 is 60.141 mm which is also the radius of curvature of the annular object as shown on FIG. 4*b*. The sag of the annular object and image over 25 mm is 1.3 mm. The length p of object strip 17 and image strip 18 is 25 mm so as to cover the film image area. They can extend further to 35 mm to cover also the film perforations. The distance s from the vertex of the concave mirror to the object and image plane is 302.903 mm.

Using the quarter wave criterion for acceptable image quality, the field width w is 1.8 mm. It is also possible to use a straight slit in place of the annular one. A straight slit with width of 0.5 mm would fit within the annular width of 1.8 mm. However, the narrower slit will necessitate higher power densities at the film, which may heat the film sufficiently to cause film buckling at high printing speed.

An extremely fast, high resolution printer according to the present invention is inexpensive compared to alternative printers. A comparable system using refractive lens requires an expensive lens with a large number of elements and would have significant levels of veiling glare, flare.

The invention has been described in detail with particular reference to certain preferred embodiments thereof, but it will be understood that variations and modifications can be effected within the scope of the invention. For example, the invention would be useful for camera negative used for dailies. Also, in an alternative embodiment, internal cylinder 34 is the outer surface of common transport shaft 13.

PARTS LIST

10. Contact printer
11. Negative intermediate film
12. Print film
13. Common transport shaft
14. Continuous optical film printer
15*a*. Integrating cylinder
17. object strip
17*a*. Annular opening
18. image strip
19. Two dimensional film frame
20. Imaging optics
21. Concave spherical mirror
22. Convex spherical mirror
25. Unit magnification optical imaging system
27. Lens-like phase feature
30. Source
31. Lamp
32. Condenser lens
33. Opening
34. Internal cylinder
36. Driving sprocket wheel
36*a*. Sprocket wheel
36*b*. Sprocket wheel
40*a*. Folding mirror
40*b*. Folding mirror
41. Optical axis
45. Point
50*a*. Folding mirror
50*b*. Folding mirror

What is claimed is:

1. A high speed, high resolution, continuous optical film printer comprising:

common transport shaft for transporting a negative intermediate film and a print film, wherein said negative intermediate film and said print film are mounted side by side on said common transport shaft;

an illumination system which illuminates an object strip on a frame of said negative intermediate film with light having a Numerical Aperture greater than 0.4 as said negative intermediate film is moved by said common transport shaft past said illumination system;

a unit magnification optical imaging system, which projects an annular image on said print film side by side with said object strip;

wherein said print film and said negative intermediate film are located between said common transport shaft and said unit magnification optical imaging system;

wherein said object strip and said annular image are located on said common transport shaft;

wherein said object strip and said image strip are parallel to an axis of rotation of said common transport shaft; and wherein said unit magnification system is comprised of a two-mirror monocentric and telecentric system.

2. An optical film printer as in claim 1, where said negative intermediate film and said print film are transported by at least two sprocket wheels mounted on said common transport shaft.

3. An optical film printer as in claim 1, where said illumination system is comprised of a source and an integrating cylinder and wherein said integrating cylinder is located on said common transport shaft.

4. An optical film printer as in claim 3 wherein said light enters into an annular space between said common transport shaft and an interior surface of said integrating cylinder.

5. An optical film printer as in claim 3 wherein said integrating cylinder is stationary.

* * * * *